UNITED STATES PATENT OFFICE.

LAWRENCE VINCENT REDMAN, OF LAWRENCE, KANSAS, ASSIGNOR, BY MESNE ASSIGNMENTS, TO AMBEROID CHEMICAL PRODUCTS COMPANY, OF CHICAGO, ILLINOIS, A CORPORATION OF WEST VIRGINIA.

COMPOSITION OF MATTER AND PROCESS OF PRODUCING THE SAME.

1,107,703.   Specification of Letters Patent.   Patented Aug. 18, 1914.

No Drawing.   Application filed February 17, 1911. Serial No. 609,168.

*To all whom it may concern:*

Be it known that I, LAWRENCE VINCENT REDMAN, a citizen of Canada, residing at Lawrence, in the county of Douglas and State of Kansas, have invented a new and useful Improvement in Compositions of Matter and Processes of Producing the Same, of which the following is a specification.

The present invention constitutes an improvement on the invention set forth in my pending application No. 567,353, filed June 17, 1910; and the primary object of the present invention is to provide an improved process of obtaining a product of the general character set forth in the application referred to, with improved results in the product.

A product of the character to which the present invention relates is adapted for coating or varnishing surfaces of wood, metal and other materials; and the composition of matter is also adapted to serve as a binder, or adhesive, and, in fact, in many situations where a hard, comparatively strong, stable substance, of great chemical and physical inertness is required. Such product, in its final stage, may be made resistant to the action of water and known solvents and made infusible. The new composition of matter may be employed as an artificial amber for many purposes, and may be used for making buttons, and also for making molding blocks, or dies, for many purposes. Also, the new composition may be employed for insulating purposes, and for other uses too numerous to mention.

In practising my invention, I prefer to proceed as follows, that is to say: Compound or mix together a phenol, such as carbolic acid ($C_6H_5OH$), or a homologue, hexamethylenetetramin [$(CH_2)_6N_4$], an initial-product solvent, such as denatured alcohol, acetone, or amylacetate, and a small amount of glycerin, or the like, which is adapted to modify the final product, by lessening the brittleness, or in other words, by contributing a certain amount of pliability and increasing the elasticity. As an illustration, I may take 90 grams of carbolic acid, dissolve the same in three grams of glycerin ($C_3H_8O_3$), mix the same with 23 grams of hexamethylenetetramin, and add 80 grams of alcohol; after thus compounding or mixing the ingredients, subject the resultant mixture to the action of heat at a temperature of about 80° C. for, say, five hours. This initial product may be applied in whatever way desired to surfaces, as a coating, or may be used as a binder, glue or adhesive, allowing the alcohol time to evaporate. The initial product may be subjected to the action of heat at approximately 130° C. to 190° C. under a pressure of from eighty to one hundred and twenty pounds per square inch or as much greater as desired, maintaining this temperature and pressure for a period of from thirty minutes to several hours, depending upon the amount of material being treated, to obtain what I term the final product. The heat hastens the reaction, and the pressure tends to regulate the ebullition due to the escape of ammonia and maintain the density of the top portion of the product. Moreover, the concentration of the air (compressed air being used for pressure purposes) has an influence in producing the coloring of the material being treated, due probably to oxidation.

The introduction of the alcohol before the first heat treatment, which results in what I may term the initial product, has the important advantage that the alcohol will act to retard the reactions and thus render the process more readily controllable, the alcohol, in the end, serving also to hold the initial product in solution.

When the mixture is subjected to heat at a temperature of about 80° C., it soon changes its condition to a yellowish transparent mobile liquid with a smell of ammonia, and after approximately five hours heating at such a temperature, results in what I have termed the initial product. This product, when produced in the presence of alcohol, is held in solution by the alcohol and may be employed as a varnish. After being applied in a thin coating and allowed to stand for some time, it changes its characteristics, and becomes somewhat insoluble in known solvents. This initial product, were it not for the presence of the alcohol, would become viscous after the approximately one-half hour's heat treatment at a temperature of 80° C. or thereabout, and would solidify on cooling, being soluble, however, in alcohol. The expression "initial product" is meant to cover the product after the first heat treatment, with or without the removal or evaporation of the solvent.

As stated above, the alcohol not only serves, in the end, as a solvent for the initial product, but acts as a controlling agent during the reactions which occur while the heat treatment is in progress. Any suitable alcohol, or any other suitable solvent which will serve as a controlling agent during the re-actions which occur while the heat treatment is in progress, may be used.

The glycerin is employed to render the product more pliable and modify the color, which it does by changing the color to a ruby red. If desired, it may be omitted, however, or some substitute may be employed in lieu of glycerin. Where the glycerin is employed, the carbolic acid may be dissolved in it; otherwise, it is necessary or desirable to melt the carbolic acid before mixing it with the hexamethylenetetramin. Certain advantages in the treatment, as well as in the quality of the product, are attributable to the use of glycerin, or a substitute.

When it is desired to produce the final product, by the final heat treatment, this may be done by virtually continuing the heat treatment, but at a higher temperature, and preferably, although not necessarily, under pressure. After the mixture has been subjected to the high temperature mentioned, under pressure, for a period of time, the duration of which depends upon the quantity of material being treated, it assumes the condition of a solid which is insoluble in known solvents; and, in this state, the substance is adapted for use as a substitute for amber, and may be employed as an electric insulator, heat insulator, and for other purposes too numerous to mention.

When the initial product is used for coating purposes, the article coated may be baked, if desired, which will hasten the change of the coating to the insoluble state, without detriment to the coating. The baking may be performed in vacuum, under atmospheric pressure, or under additional pressure, as desired. During the whole course of treatment ammonia is eliminated from the mixture, and after the ammonia has ceased to come off, the product soon becomes both insoluble and infusible. Inasmuch as no water is employed in the mixture, and water is not formed at any stage in the process of treatment, formaldehyde is not produced, so that the objections incident to a process where formaldehyde is formed are obviated. Moreover, the product does not, under treatment, or at any time, tend to stratify or separate into layers of varying characteristics or composition. In other words, a uniform, homogeneous product is secured, and so far as I have been able to determine, only ammonia is evolved or given off during the process.

When the product is to be used as a binder for abrasive material, such as carborundum or asbestos sheets, the heat treatment at approximately 80° C. may be continued with the distillation of alcohol until the desired condition of viscosity is reached. Then aluminum oxid, carborundum, sand, etc., may be added and the mixture baked. Taken at the same stage, the initial product may be mixed with lead oxid, sand, talc, fuller's earth, graphite, or other neutral material, for coating or painting purposes. Also, in the dissolved condition, the initial product may be mixed with mineral or coal tar dyes, as desired.

The initial product in the dissolved state above set forth may be employed as a substitute for varnishes, lacquers, etc., being applicable to wooden, metal, cement, and other surfaces. The initial product will serve also as a substitute for glue or cement for uniting surfaces, with improved results. After the final heat and pressure treatment above set forth, the material is a solid infusible mass, and, in this state, may be employed as a sort of artificial amber, and, in fact, the compound may be put to uses too numerous to mention, where a hard infusible product of great chemical inertness is desired, or where material may be called upon to resist high temperature or the action of acids, alkalis or solvents.

When employed as a coating for surfaces, the material gives a very hard lustrous finish, practically transparent and may be practically colorless, or may have a varying yellowish amber to deep red tint. It may be given a deep red color, if desired, by raising the final temperature to 170° C. to 195° C. The finish produced is of glass-like hardness and little liable to danger of scratching, and when the material is modified by the use of glycerin, or the like, the material possesses sufficient pliability and tenacity to prevent it from cracking or peeling. It may be added that after heating at a high temperature, (second heat treatment) as suggested above, under pressure, the material passes, without bubbling, to a transparent, slightly yellowish, amber or red glassy, insoluble and infusible product.

The proportions and method of treatment suggested above are those which I have found the most advantageous, but I desire to be understood as not limiting myself unnecessarily. Again, while I prefer to employ carbolic acid, I may employ a homologue, such as cresol $(CH_3C_6H_4OH)$, or other phenolic body. I desire to claim my invention in sufficiently generic terms to include substitutes.

It is characteristic of and an advantageous feature of my invention that no water is formed during the process, so that the problem of eliminating such a deleterious element from the mass undergoing treatment is wholly obviated, and the process is simplified and shortened, the control of the process is rendered comparatively easy, and the danger of lack of uniformity of texture, composition and the desirable qualities generally of the final insoluble product is lessened. As a matter of fact, the mass possesses homogeneity throughout during all stages of the heat treatment, having no tendency to separate or stratify in layers having varying compositions and qualities. My process also renders unnecessary the introduction of a condensing or catalytic agent, so that there remains no necessity for eliminating such agent at the end of the reaction. Moreover, the reaction is anhydrous in my process, no water being introduced (as where a solution of formaldehyde is employed), and no water of formation resulting from the reaction. Thus, it will be understood, the hexamethylenetetramin enters into direct reaction with the phenol, and no free formaldehyde is produced at any stage.

The foregoing detailed description has been given for clearness of understanding only, and no undue limitation should be understood therefrom, but the appended claims should be construed as broadly as permissible.

While the commercial ingredients which may be employed in practicing my process may contain water in small quantities, the amount is too small to seriously affect the efficacy of the process or impair the product, so that practically it may be said that the process is anhydrous, as above indicated. It will be noted that the proportions which are preferably employed in practising my process are one reacting weight of hexamethylenetetramin to more than five reacting weights of the phenolic body employed, the phenolic body employed being an uncombined or simple, commercially obtainable, ingredient. I do not intend, by the expression "phenolic body" to include a condensation product of formaldehyde and phenol, the production of which would necessitate the practice of a process having many disadvantages.

What I regard as new and desire to secure by Letters Patent is—

1. The process of producing a phenolic condensation product, which consists in compounding a phenolic body, hexamethylenetetramin and an initial-product solvent which acts also as a controlling agent, and subjecting the same, after compounding, to the action of heat and driving off ammonia.

2. The process of producing a phenolic condensation product, which consists in compounding a phenolic body, hexamethylenetetramin and an initial-product solvent which acts also as a controlling agent, said hexamethylenetetramin and said phenolic body being used in the proportions of one reacting weight of hexamethylenetetramin to more than five molecular weights of said phenolic body, subjecting the same, after compounding, to the action of heat at comparatively moderate temperature for a predetermined period of time, and afterward subjecting the initial product to a higher temperature under pressure for a predetermined period of time.

3. The process of producing a phenolic condensation product which consists in dissolving carbolic acid in a comparatively small quantity of glycerin, mixing therewith hexamethylenetetramin, the materials being employed in the proportions of more than five molecular weights of carbolic acid to one of hexamethylenetetramin, adding to the mixture an initial-product solvent which acts also as a controlling agent, and subjecting the mixture to the action of heat for a period of time.

4. The process of producing a phenolic condensation product which consists in compounding a phenolic body, hexamethylenetetramin and an initial-product solvent which acts also as a controlling agent, these substances being compounded substantially in the absence of water, and subjecting the mixture in such condition to the action of heat and thereby driving off ammonia.

LAWRENCE VINCENT REDMAN.

In presence of—
HUGH BLAIR,
JENNIE WATT.